United States Patent [19]
Wardell et al.

[11] Patent Number: 5,546,972
[45] Date of Patent: Aug. 20, 1996

[54] KIT COVER SYSTEMS FOR SWIMMING POOLS, HOT TUBS AND PATIOS

[76] Inventors: Jacqueline R. Wardell, 139 N. Bodmer Ave. Rear; James R. Wardell; Allison E. Wardell, both of 136 W. First St., Strasburg, all of Ohio 44680

[21] Appl. No.: 321,265

[22] Filed: Oct. 11, 1994

Related U.S. Application Data

[63] Continuation-in-part of Ser. No. 28,943, Mar. 5, 1993, abandoned.

[51] Int. Cl.⁶ ..................................................... E04H 15/38
[52] U.S. Cl. ........................... 135/129; 135/119; 296/105
[58] Field of Search ............................... 135/88.13, 88.15, 135/96, 124, 129, 136, 116, 115, 119; 296/101, 104, 105, 100, 43

[56] References Cited

U.S. PATENT DOCUMENTS

| | | | |
|---|---|---|---|
| 614,473 | 11/1898 | Ivy | 135/110 |
| 1,627,716 | 5/1927 | Teachout . | |
| 2,469,958 | 5/1949 | Fowler | 296/105 |
| 3,361,144 | 1/1968 | Folkes | 135/119 X |
| 3,424,179 | 1/1969 | Minot | 135/119 X |
| 3,481,645 | 12/1969 | Stepp | 296/105 |
| 3,688,787 | 9/1972 | Feather . | |
| 3,729,890 | 5/1973 | Yamamoto et al. | 135/110 X |
| 4,285,539 | 8/1981 | Cole | 296/105 |
| 4,844,109 | 7/1989 | Navarro | 135/110 X |
| 5,005,896 | 4/1991 | Li | 296/105 X |
| 5,080,422 | 1/1992 | DeMonte et al. | 296/105 |
| 5,338,084 | 8/1994 | Wardell | 296/105 |

FOREIGN PATENT DOCUMENTS

| | | | |
|---|---|---|---|
| 303683 | 1/1929 | United Kingdom | 296/105 |

*Primary Examiner*—Lanna Mai
*Attorney, Agent, or Firm*—Donald A. Bergquist

[57] ABSTRACT

A collapsible cover system and kit therefore are removably mounted to a plurality of spaced stake sockets secured within longitudinally extending areas on opposite sides of a swimming pool or hot tub. Stakes, disposed in the stake sockets, are slidingly connected to two lengths of spaced guide tracks that extend along the sides of the pool or hot tub. Inverted bow-shaped members having free ends are removably secured to carrier means that slidingly connect the bow-shaped members to the guide.

In additional embodiments the spaced guide tracks are deposed either in a trough that may be covered when the particular rail sections are not in use, or hingedly deposed adjacent a trough into which rail particular rail sections may be stored when they are not in use.

7 Claims, 9 Drawing Sheets

KIT COVER SYSTEMS FOR SWIMMING POOLS, HOT TUBS AND PATIOS

This is a Continuation-in-part of application Ser. No. 08/028,943, filed Mar. 5, 1993 now abandoned.

FIELD OF THE INVENTION

This invention relates to the field of flexible cover systems for swimming pools and hot tubs. More particularly, the invention relates to a flexible cover system and kit therefor that can be quickly and easily retrofitted to new or existing swimming pools and hot tubs.

BACKGROUND OF THE INVENTION

Flexible cover systems for swimming pools and hot tubs typically use inverted U-shaped bow members that are longitudinally displacable between extended and collapsed conditions to operate a flexible cover member, such as a tarp, between covered and uncovered conditions relative to the space above the pool or hot tub.

One problem with the known cover systems is that they are permanently installed in the area surrounding the pool and are not constructed to be retrofitted to existing pools or hot tubs without substantial modification to the unit itself. Besides the time-consuming and expensive labor costs associated with installing the prior art cover systems, it is also expensive to remove these systems.

OBJECTS AND SUMMARY OF THE INVENTION

It is an object of the present invention to provide a flexible cover system and kit therefor that can be quickly and easily secured to a pool, patio, or hot tub to obviate the problems and limitations of the prior-art systems.

It is a further object of the present invention to provide a cover system and kit therefor that can be quickly and easily retrofitted to a pool or hot tub.

Yet another object is to provide a flexible cover system and kit therefor that can be quickly and easily removed from a pool or hot tub to which it was previously installed.

In accordance with the invention, there is provided a collapsible cover system and kit therefor adapted in use to be removably mounted to a plurality of spaced sockets secured within longitudinally extending areas on opposite sides of a pool or hot tub.

The system and kit comprise a plurality of stakes having a lower end adapted in use to be securely disposed in stake sockets and an upper end adapted in use to project upward from the pool or hot tub. A plurality of longitudinal rails are adapted in use to fit together in end to end registering relationship and form two lengths of spaced guide tracks that extend along the sides of the pool or hot tub. Each of the rails is adapted in use to be attached to the upper end of one of the stake members for longitudinal sliding movement of the rail with respect to the stake without vertical disengagement of the rail from the stake. A plurality of inverted bow-shaped members having free ends are adapted in use to be removably secured to the guide tracks. A plurality of carrier means are adapted in use to slidingly connect the free ends of the bow-shaped members to an associated guide track.

Also, in accordance with the invention, each stake member has a T-shaped stake member projecting outward from the upper end and each of the rails has a bottom section with a T-shaped slot formed therein that extends the length of the rails and which slot is adapted in use to receive the T-shaped stake member and enable longitudinal sliding movement of the rail with respect to the stake while preventing vertical disengagement of the rail from the stake.

Further, in accordance with the invention, a flexible cover member is adapted in use to be supported by the bow-shaped members to enclose a portion of the pool or hot tub when the bow-shaped members are in an expanded condition. The bow-shaped members are U-shaped and have a first generally horizontal portion adapted in use to extend transversely in spaced relation above the pool or hot tub. Also, the bow-shaped members have a pair of downwardly extending vertical leg portions with free ends adapted in use to be secured to the guide tracks.

According to the invention, each of the longitudinal rails has an interlock means at either end adapted in use to couple with the interlock means of an adjacent rail. The interlock means comprises a V-shaped groove at one end of the rail and a wedge-shaped projection at the opposite end of the rail whereby the wedge-shaped projection is adapted in use to be demountably coupled with the V-shaped groove to secure adjacent rails to each other. In another embodiment, the interlock means comprise at least one rectangular-shaped groove at one end of the rail and at least one rectangular-shaped projection at the opposing end of the rail whereby the rectangular-shaped projection is adapted in use to be demountably coupled with the rectangular-shaped groove to secure adjacent rails to each other. In addition, the interlock means includes lock means at either end of the rails adapted in use to secure adjacent coupled rails to each other.

BRIEF DESCRIPTION OF THE DRAWINGS

The structure, operation and advantages of the presently preferred embodiment of the invention will become further apparent upon consideration of the following description taken in conjunction with the accompanying drawings, wherein.

DETAILED DESCRIPTION OF THE INVENTION

Hereafter in this specification and especially in the claims attached hereto, we shall use the term "recreation area" to include swimming pools and hot tubs, along with decks and walkways associated therewith, and also patios and outdoor sitting and lounging areas. The following description concentrates upon swimming pools and hot tubs by way of specific examples, but this is not intended to limit the invention thereto.

Figure 1:
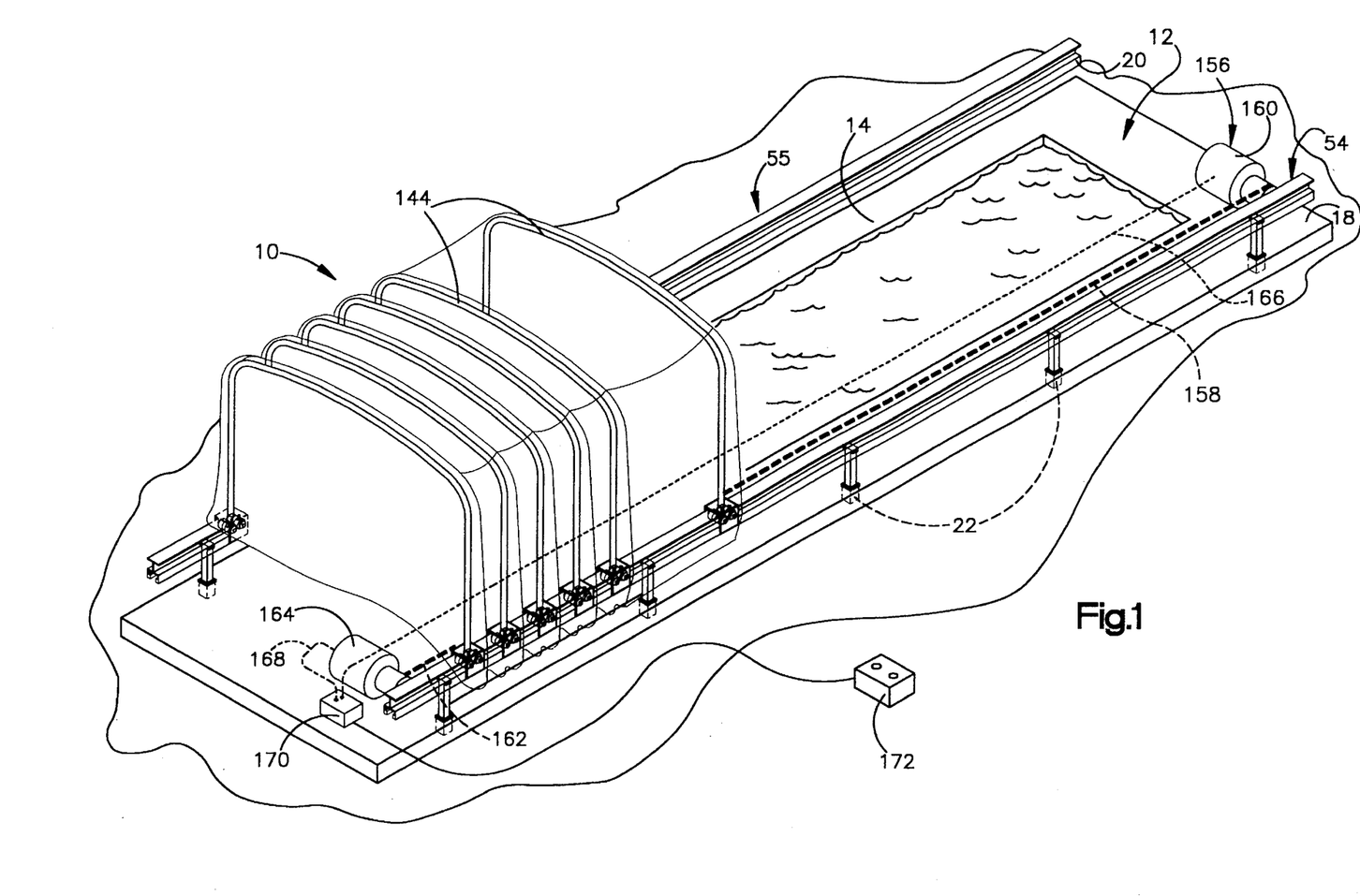
FIG. 1 is a side perspective view of a flexible cover system, in accordance with the invention, used in connection with a swimming pool or hot tub, the bow shaped members that support the flexible cover being shown in partially expanded condition.
Figure 1A:
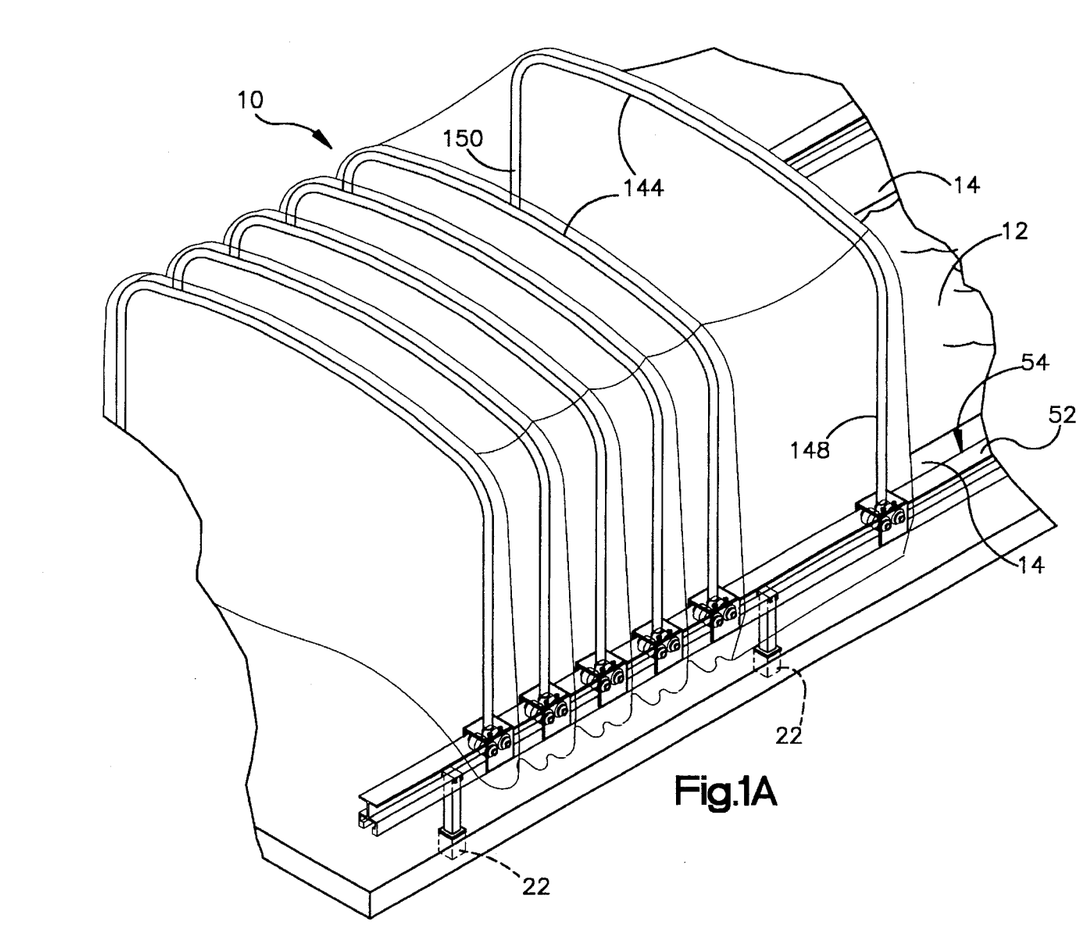
FIG. 1A is an enlarged, partial side perspective view of the flexible cover system illustrated in FIG. 1.

Referring to FIGS. 1 and 1A, there is illustrated a novel flexible cover system 10 in connection with a swimming pool or hot tub 12. The pool or hot tub 12, as seen in the enlarged view of FIG. 1A, has a walkway 14 with longitudinally extending areas extending substantially the length of opposite sides of the walkway 14. A plurality of spaced stake sockets 22 are located within the longitudinally extending areas on the opposite sides 18, 20 of the pool or hot tub. Normally, the spacing between adjacent sockets is 4 feet; in practice, however, the spacing between the sockets can vary by several inches from the normal spacing. This variation in spacing must be taken into consideration sot that the disclosed invention can be retrofitted into existing pools or hot tubs.

Figure 2:
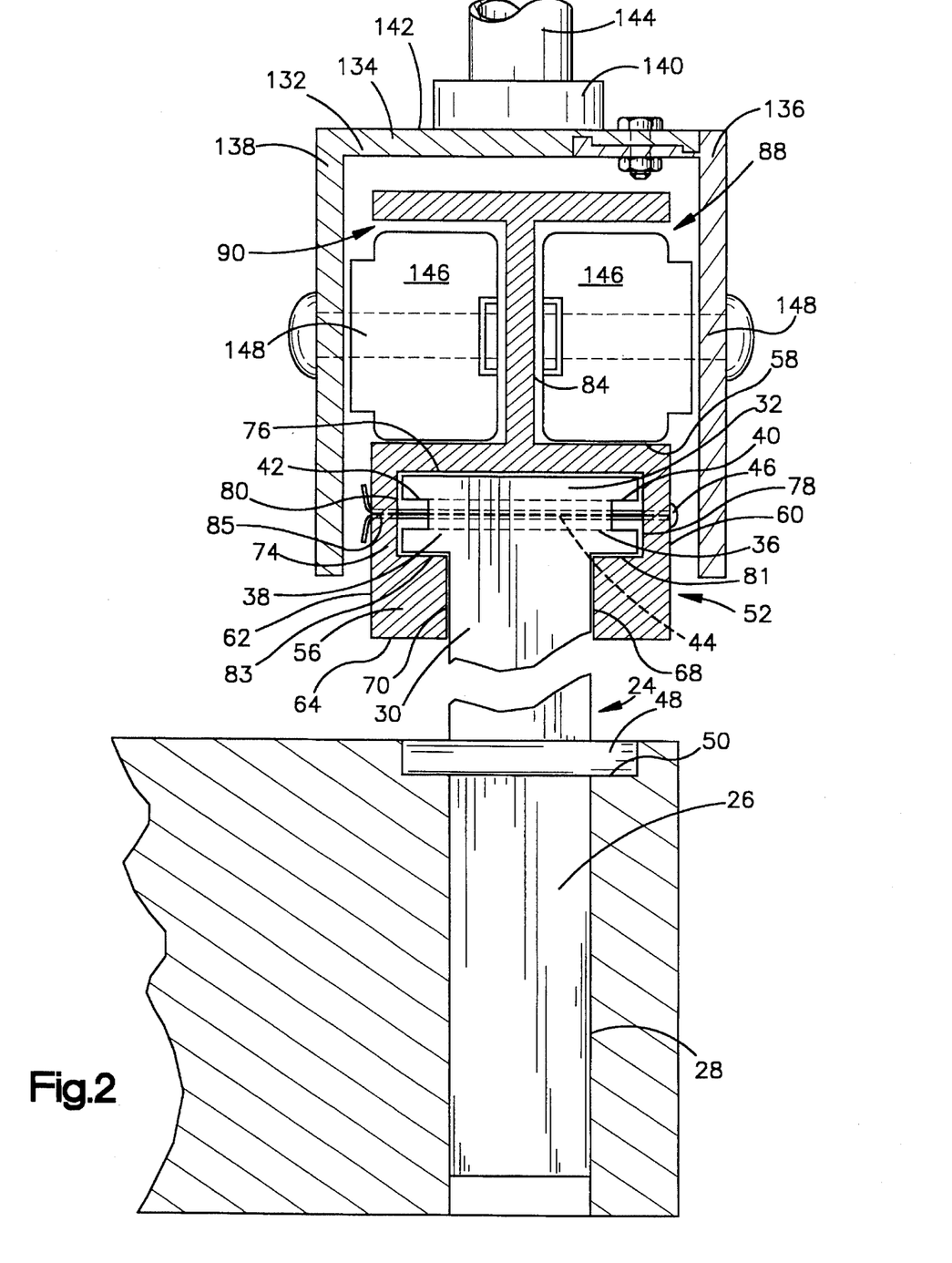
FIG. 2 is a cross-sectional view illustrating a support structure for attaching a bow-shaped member to the pool or hot tub of FIG. 1.
Figure 4:
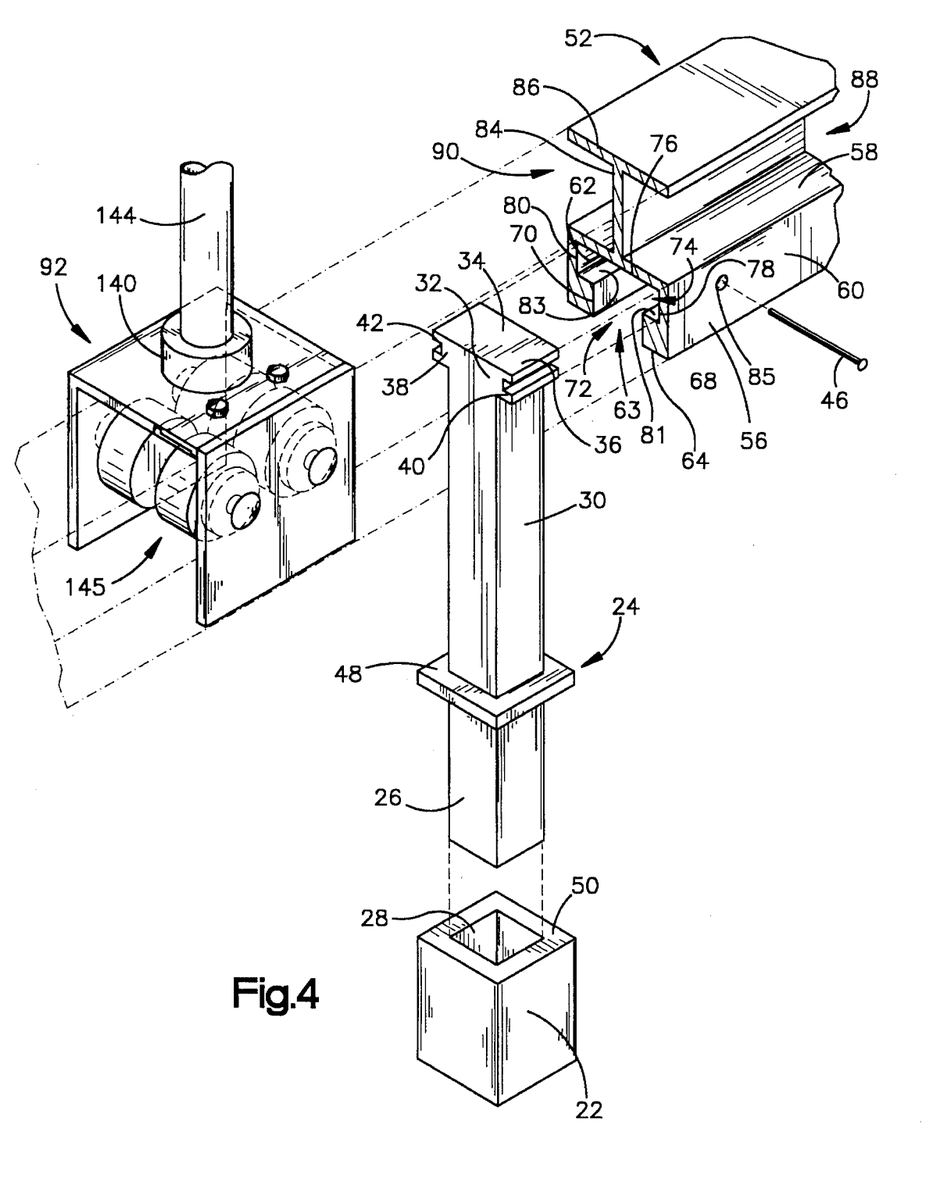
FIG. 4 is an exploded perspective view of the support structure for attaching a bow-shaped member of a cover system to the socket disposed in a ledge or walkway surrounding a pool or a hot tub.

The flexible cover system 10 includes a plurality of stakes 24 having a lower end section 26 adapted in use to be securely disposed in the rectangular or square throughbore 28 of sockets 22, as illustrated in FIGS. 2 and 4. The stakes 24 have an upper end section 30 with an interlocking stake head 32 at the free end. Head 32 has a flat upper surface 34 and shoulders 36 and 38 and extending outward to the opposite sides of stake 24. A throughbore 44, disposed substantially in the center of stake head 32, is provided to receive a locking pin 46, as discussed in more detail hereinafter. Stakes 24 also have a collar 48 located between the upper and lower end sections 30 and 26, to seat on the upper end face 50 of socket 22 and secure the stake 24 within the socket 22 by means of gravity. Grooves 40 and 42, generally rectangular, are provided in shoulders 36 and 38, respectively, and extend the width of head 32 to serve as drill guides for drilling said throughbore 44. In practice, the stake head 32, the upper portion 30 of the stake 24, and the collar 48 may be of a single extrusion that is permanently attached to the lower portion 26 of the stake 24.

A plurality of longitudinal rails 52 are adapted in use to fit together in end to end registering relationship to form two lengths of spaced guide tracks 54 and 55 that project above and extend along the sides of the pool or hot tub. The distance between the guide tracks 54 and 55 and the top surface of the pool or hot tub is established by the length of the upper end sections 0 of stakes 24; this length may even be zero. Each rail 52 is about four or eight feet in length.

Each rail 52 is preferably formed of a one-piece metal extrusion. The rails 52 have a generally rectangular bottom section 56 with a top wall 58, side walls 60 and 62, and a bottom surface 64. A T-shaped slot 63 is formed in the bottom section 56 and extends the full length of each rail. T-shaped slot 63 has the side walls 68 and 70 forming the narrower leg portion 72 opening at the bottom surface 64 of each rail 52. The wider head portion 74 of slot 63 has a flat bottom surface 76 adapted to slide on the upper surface 34 of stake 24, as further discussed below, side walls 78 and 80 that are spaced from each other at least a distance greater than the width of head 32, and upper surfaces 81 and 83 that are substantially parallel to bottom surface 76. Preferably, the distance between upper surfaces 81 and 83 and bottom surface 76 is enough to enable one rail to be removed without removing an adjacent rail, as discussed in more detail below. Bores 85 extend into head portion 74 of T-shaped slot 63 through side walls 60 and 62 and receive the locking pin 46, as discussed below.

The rails 52 also have a T-shaped upper section 82 extending upward from top wall 58. Upper section 82 includes an upright support wall 84 secured at one end to the top wall 58 equidistant from side walls 60 and 62 and extending the length of the rail. The upper section 82 also has top wall 86 disposed parallel to wall 58 and secured to the other end of support wall 84. Oppositely facing U-shaped sections 88 and 90 formed between the top wall 58 and the top wall 86 interconnect with a carrier means 92, as discussed in detail below.

Figure 5:
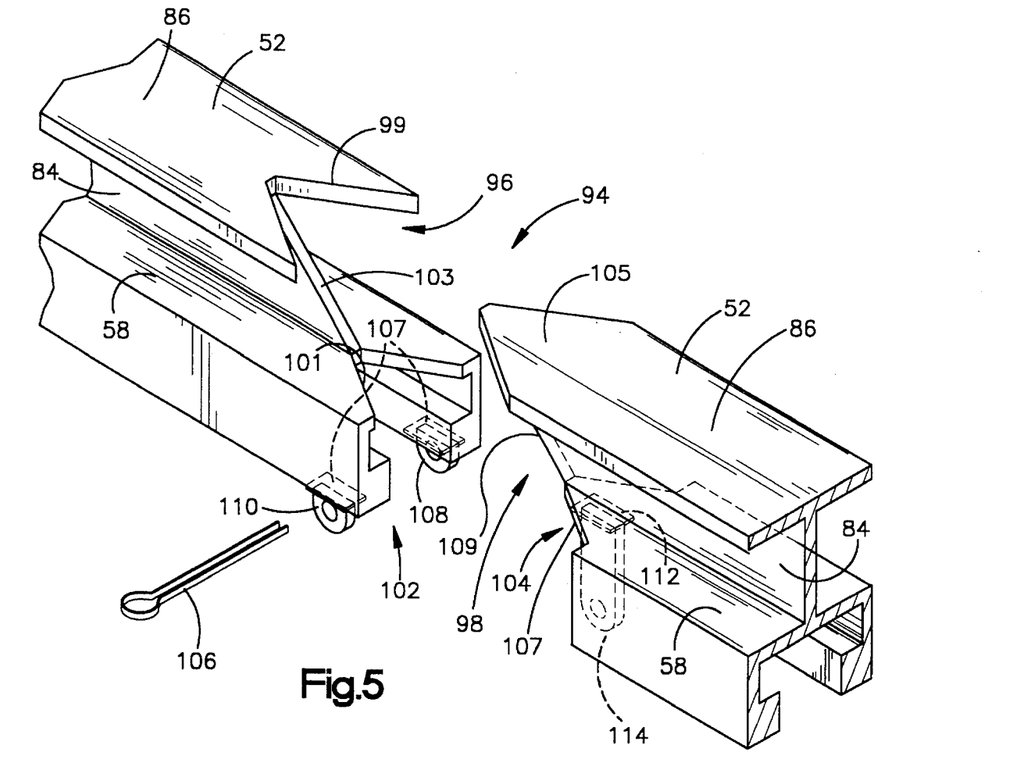
FIG. 5 is a perspective, exploded view illustrating the preferred embodiment of the interlocking structure between longitudinal rails.
Figure 6:
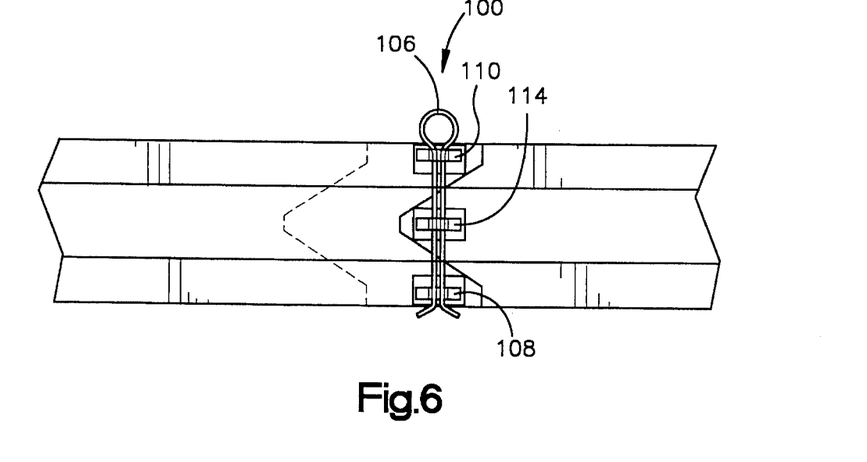
FIG. 6 is a bottom view through FIG. 7 illustrating interlocked adjacent rails.
Figure 7:
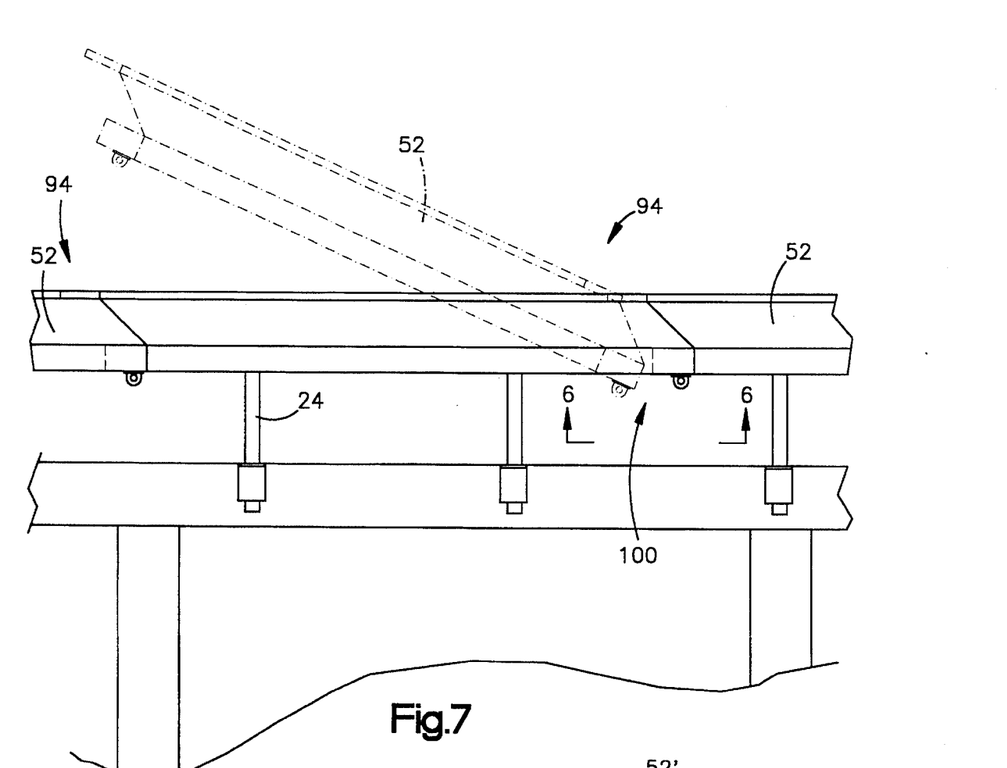
FIG. 7 is a side view of a section of the pool or hot tub illustrating the preferred embodiment of interconnected longitudinal rails with a rail being removed illustrated in phantom.

Referring to FIGS. 5, 6, and 7, there is shown an embodiment of an interlock means 94 at either end of each longitudinal rail 52 that is adapted in use to mate with the interlock means of an adjacent rail. The interlock means 94 comprises a V-shaped groove 96 at one end of rail 52 and a wedge-shaped projection 98 at the opposing end of rail 52. The V-shaped groove is offset so that the groove 99 cut in the upper wall 86 of rail 52 is set further back towards the opposite end of the rail than is the groove 101 cut in the top wall 58 of the rail. The support wall 84 forms a straight inclined surface 103 extending between the apexes of the grooves 99 and 101. The wedge-shaped projection 98 is offset so that the projection 105 extending outward from the upper wall 86 of rail 52 extends further towards the opposite end of the rail than does the projection 107 extending outward from the top wall 58 of the rail. The support wall 84 forms a straight inclined surface 109 extending between the tips of projections 105 and 107. The projection 98 mates in the groove 96 so that adjacent rails can be demountable interlocked to secure the adjacent rails to each other.

The interlock means 94 also includes lock means 100 to demountably lock adjacent rails to each other. Lock means 100 can be a hinge type latch comprising two interlocked sections 102 and 104 that are secured together with a pin 106. Section 102 includes at least two spaced projections 108 and 110 with bores therethrough. The projections 108 and 110 are disposed on either side of the groove 101 and project downward from the bottom surface 64. Section 104 includes at least one projection 114 with a bore therethrough. Projection 114 is disposed in the center of projection 107 so as to mesh between projections 108 and 110 with all three bores aligned when the ends of adjacent rails are interlocked with each other. A pin 106 is then driven into the aligned ores to secure the rails together. It can easily be seen that if the projections 108, 110, and 114 are of sufficiently low profile to permit passage of carrier means 92, described hereinafter, then they may be mounted atop upper wall 86 in a manner analogous to that described immediately above.

Figure 8:
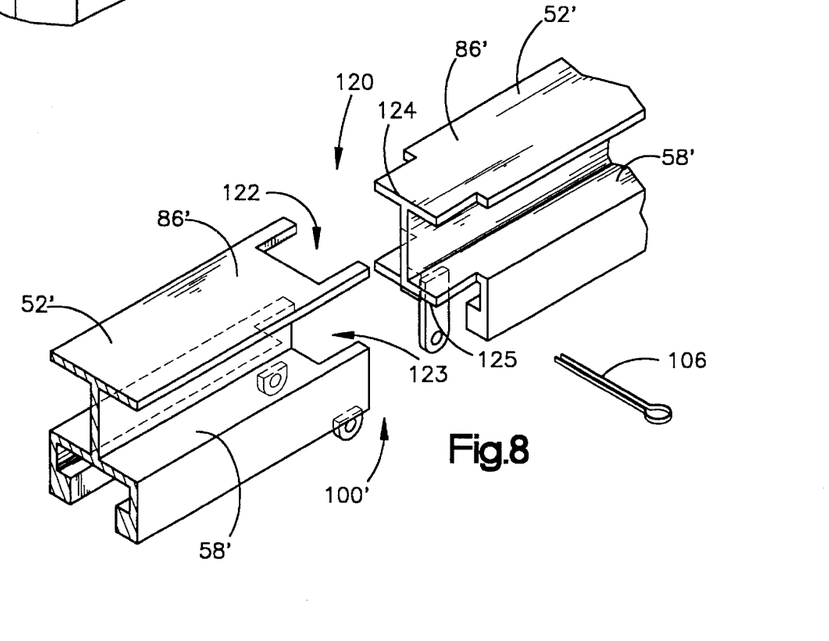
FIG. 8 is a perspective, exploded view illustrating an alternative embodiment of the interlocking structure between longitudinal rails.

While a suitable embodiment of the interlock means 94 is illustrated in FIGS. 5–7 and discussed above, it is also within the scope of the present invention to provide a second embodiment of interlock means 120 as illustrated in FIG. 8. The interlock means 120 comprises upper and lower rectangular-shaped slots 122 and 123 at one end of the rail 52' and rectangular-shaped projections 124 and 125 at the opposing end of the rail. Throughout the specification, primed numbers represent structural elements that are substantially identical to structural elements represented by the same unprimed number. The rectangular-shaped slots are disposed in the upper wall 86' and the top wall 58' of the rail 52' The rectangular-shaped projections 124 and 125 extend outward from the upper wall 86' and the top wall 58' of the opposite end of rail 52 from the rectangular-shaped slots. The projections 124 and 125 are disposed to mate with the rectangular-shaped slots 122 and 123, respectively, when adjacent rails are demountable interlocked to secure the adjacent rails to each other. Further, lock means 100' as discussed in detail above can be incorporated to demountably lock adjacent rails to each other.

Figure 9:
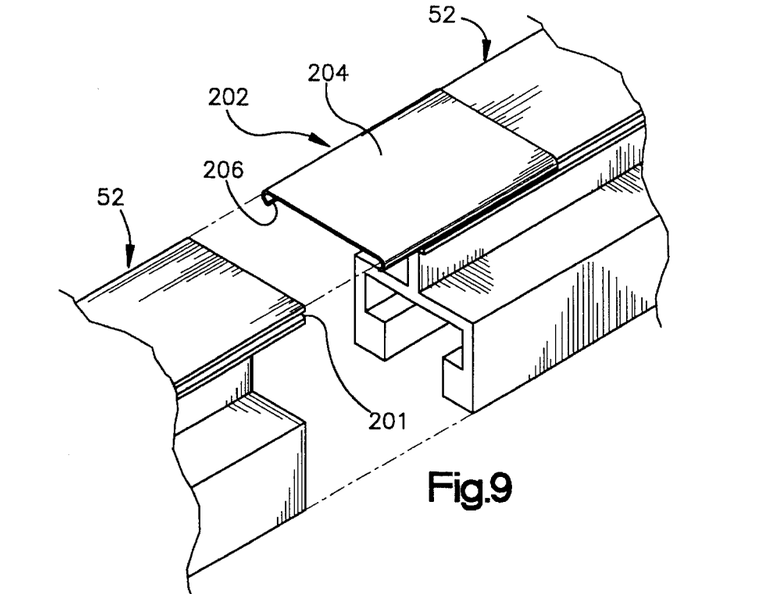
FIG. 9 illustrates the preferred mode of an interlocking structure between longitudinal rails.

The interlock means that is the preferred embodiment is yet another variation, as shown in FIG. 9. This interlock is the simplest and most economical to produce, yet it creates a completely suitable interlock.

FIG. 9 shows two adjacent rail sections 52 making up a guide track. The rail sections are modified from what has been heretofore described in that they have a longitudinal groove 201 in each outer edge of the upper wall 86 of the rail. This groove need only be several inches in length at each end of the rail section, but in practice it is economical for the groove to extend the full length of the rail because it can then be created during the extruding of the rail sections.

A joining element 202 is used, the joining element comprising a flat plate section 204 having two opposing edges 206 thereof curled downward in hook-like fashion, thereby forming a cross-section that resembles a very narrow letter "C". This joining element engages the top surface of the upper wall 86 and the two opposing curled portions engage the respective grooves 201 on the edges. The carrier means, described below, does not contact any surfaces to which joining element 202 is engaged, so the joining element does not interfere with the opening and closing of the cover of this invention. The engagement between the joining element 202 and the rail sections 52 is a slidable engagement, so the rail sections can be joined or separated at will. The joining element 202 has sufficient length, four- to twelve inches or more, to span a joint between two rail sections while engaging enough of the length of each rail section to keep them in a substantially linear alignment, vertically and horizontally, and to prevent one rail from twisting relative to the other.

Referring to FIGS. 2 and 4, there is illustrated a carrier means 92 adapted for sliding movement relative to an associated guide track 54 or 55. Carrier means 92 includes a U-shaped carrier body 132 including a base plate 134 and downwardly-projecting side plates 136 and 138 extending downward from opposite ends of base plate 134. A cylindrical sleeve 140, secured to the outer-facing surface 142 of base plate 134, is provided to receive the end of a bow-shaped member 144, as described in more detail below. In the preferred embodiment, roller means 145, such as guide wheels 146. preferably disposed in tandem, are attached by rivets 148 to opposite side plates 136 and 138. When the carrier means 92 is assembled on a rail 52, the guide wheels 146 roll along the top wall 58 of rail 52. While the carrier means 92 can be installed by sliding in onto either end of a track, it is also within the terms of the invention to provide a side plate 136 detachably connected to base plate 134, by means such as interlocking sections bolted together, as illustrated in FIG. 2. Then, one side plate of the carrier can be positioned on the track and the other can next be installed and secured to base plate 134 with means such as a nut and bolt.

Figure 3:
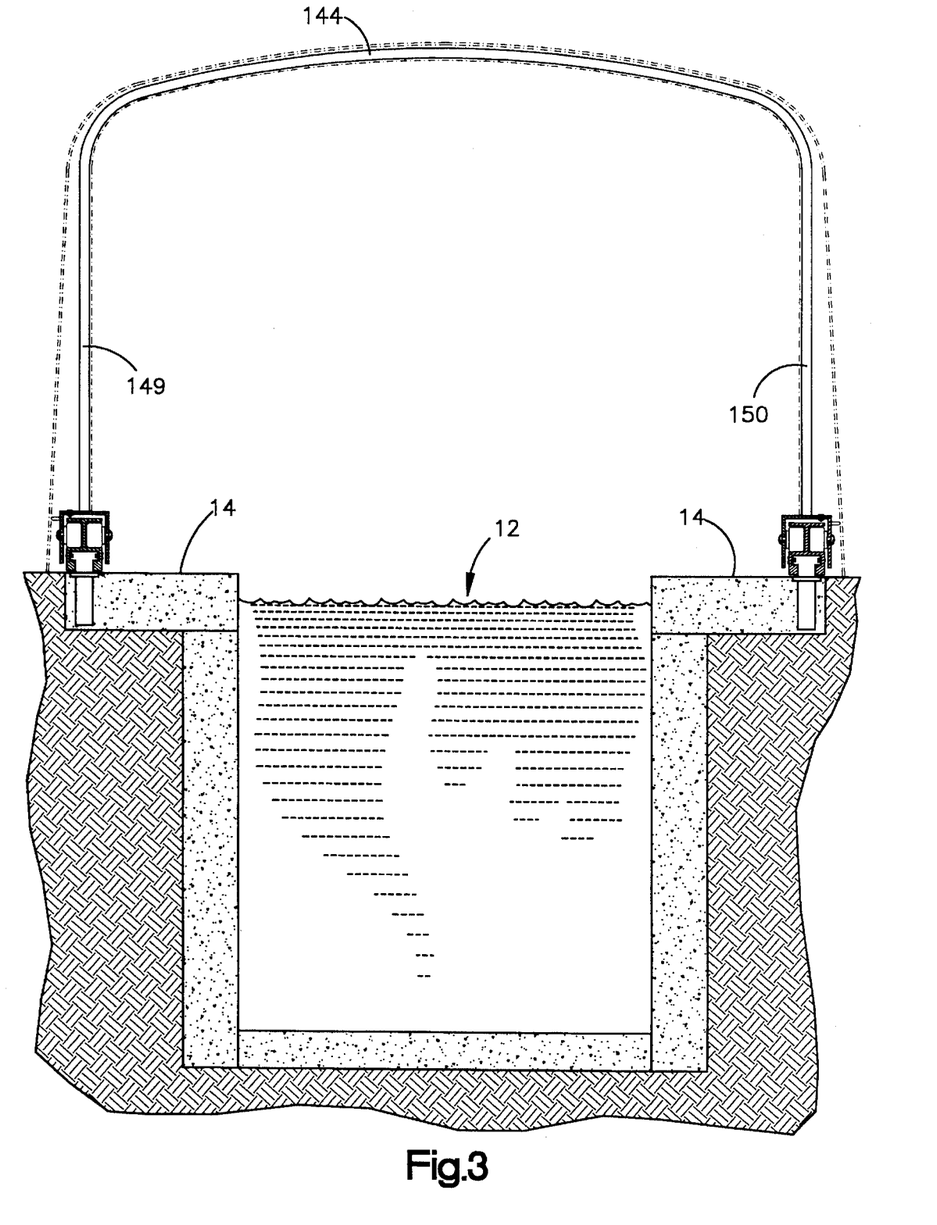
FIG. 3 is a rear end view, partially in cross-section, of the pool or hot tub with the cover system illustrated in FIG. 1.

A plurality of inverted U-shaped bow members 144 are adapted in use to extend transversely in spaced relation above the pool or hot tub, as shown in FIGS. 1, 1A, and 3. The bow-shaped members 144 each have a first generally horizontal portion 146 and a pair of downwardly-depending vertical leg portions 149 and 150. The lower ends of the leg portions 149 and 150 have a slip fit connection within the sleeves 140, and when assembled, are secured in cylindrical sleeves 140 projecting upward from carrier means 92. Carrier means 92, in turn are movably secured to guide tracks 54 and 55 to enable rolling movement relative to an associated guide track so that the bow-shaped members can be easily moved between a collapsed and an expanded condition. The bow-shaped members 144 in the collapsed condition may be selectably positioned at any location along the length of the guide tracks.

The bow-shaped members 144 are secured to a sheet-like, flexible cover member 154 adapted in use to be supported by the bow-shaped members to enclose a portion of the space above the pool or hot tub deck when the bow-shaped members are in an expanded condition and in tightly compacted relation when in the completely collapsed condition. The cover member 154 can be a tarp constructed of any conventional material such as a canvas, plastic, or other suitable material. The tarp can include a plurality of support tubes of pockets that receive bow-shaped members 144 in the manner illustrated in FIG. 6 and column 6, lines 23–40 of the U.S. Pat. No. 4,289,346 to Bourgeois, which is expressly incorporated herein by reference. The cover can have a wide band of web belting that runs along the bottom edges thereof for the length of the cover. When the cover is drawn tight by extending the cover for the full length of the guide track 54 or 55, it is held snugly to the track. An important aspect of the invention is that the cover system remains substantially within the confines of the pool or hot tub to which the cover system is being fitted or retrofitted. It need take no space outside the "footprint" of the existing pool or hot tub area.

In order to displace the bow-shaped members 144 between their expanded and collapsed positions, a power drive means 156, as schematically illustrated in FIG. 1, is provided. The rearward-most carrier means is connected to both ends of a cable 58 that in turn is wrapped about a rotary drum driven by a motor 60 located at the end of the pool and about a pulley located at the front end of the pool. The forward-most carrier is also connected to both ends of a second cable 162 that in turn is wrapped about a rotary drum driven by a motor 164 located at the front end of the pool and about a pulley located at the rear end of the pool. The power to the motors comes from power cords 166 and 168 that plug into an electrical receptacle within the unit. Similar power drive means may be positioned on either side of the pool to balance forces on the carrier means. A control box 172 can independently operate each motor. Each of the drums is independently driven by its associated motor in the forward or reverse direction. When the rear motor 160 is operated, the rearmost carrier means can be moved closer to or farther from the back end of the pool. In a similar manner, when the front motor 164 is operated, the frontmost carrier means can be moved closer to or farther form the front end of the pool.

To assemble the flexible cover system 10 on a swimming pool or hot tub 12, stakes 24 are first inserted into the sockets 22. Next, the rails are slid into place so that the interlocking heads 32 of the stakes 24 are received within the T-shaped slots in the bottom section of each rail. The distance of the slot between surface 76 and surfaces 81 and 83 is large enough so that the free end of a rail can be raised above the top of an adjacent stake while the rail is in place on the interlocking head of a stake. This is illustrated in FIG. 7, where an intermediate rail is removed without removing the rails on either side. Note that the offset relationship of the projections 98 and the grooves 96 enable the rails to be assembled and disassembled without moving the adjacent rails. Thus, the rails can be assembled without having to start at the rear of the pool and to keep the rail parallel to the surface to the pool while sliding it into position.

As the rails are put into place, the interlock means 94 are aligned and the rails are joined to form the two parallel guide tracks 54 and 55. Then, the interlocked adjacent rails can be fixed to each other with the pin 106 of lock means 100. If desired, the frontmost rail can be pinned in place with a horizontal locking pin 46 through it and the interlocking head 32 of the frontmost stake on which it is assembled. When the rails are completely in place, the rearmost rail can be pinned in place with a horizontal locking pin through it and the interlocking head of the rearmost stake on which it is assembled.

Next, the carrier means 92 are assembled on the guide tracks and attached to the power drive system 156. Continuing, the bow-shaped members 144, after being installed in the cover member 154, are slipped into the sleeves 140 of the carrier device 92. The bottom of the cover member 154 can be connected by elastic means 174 such as flexible cords, to ground anchors after the bow-shaped members are in a desired position. The cover can be opened or closed by the power system 156 and positioned anywhere along the length of the swimming pool or hot tub.

Figure 10:
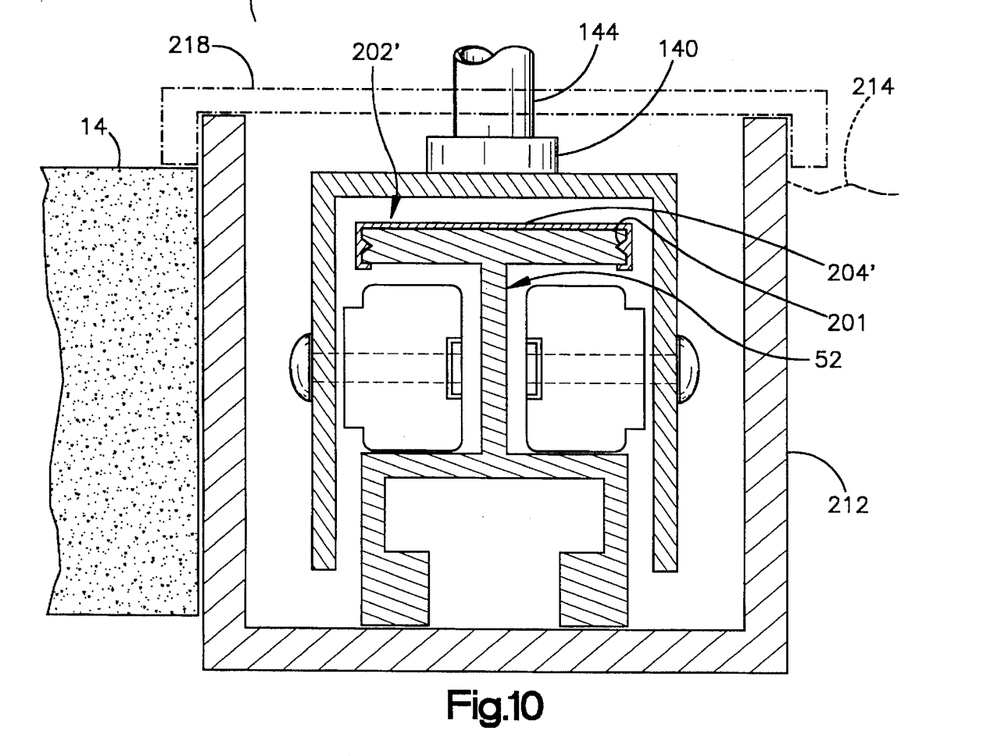
FIG. 10 is a cross-sectional view illustrating an alternative, below-grade support structure for attaching a bow-shaped member to the pool or hot tub of FIG. 1.

In one embodiment, illustrated in FIG. 10, the guide track made up of rails 52 set into a trough 212 adjacent the walkway 14 along two opposing sides of the pool or hot tub. This trough may be set into the ground 214 or attached to the edge of the walkway 14. The rails 52 would be secured in the trough to make the installation stable, but stakes and stake sockets need not be used. When the cover system is retracted, a cover or a series of cover sections may be placed over the trough to reduce the hazard the trough would otherwise present. A simple cover 218 is shown, but a hinged cover would be equally suitable.

Also shown in FIG. 10 is a modification of the preferred interlock means illustrated in FIG. 10 as 202. In the modification 202', rather than merely having the edges of the flat plate 204 curled over to engage the grooves, the flat plate 204' is a part of an element that has the elongated "C"-shaped cross-section described as 202, but the ends of the "C" embrace the upper wall 86 of the rail and separate protrusions within the "C" engage the grooves 201. This element could be extruded or, if slightly modified in an obvious manner from what is shown in FIG. 11, formed of sheet metal.

Figure 11:
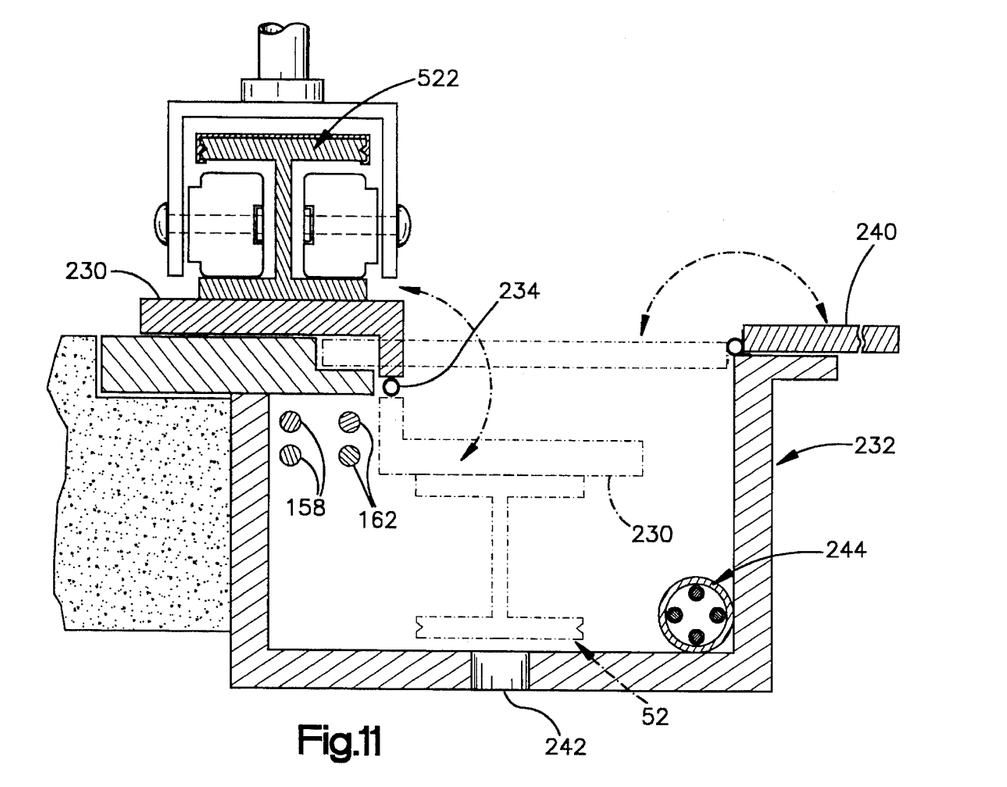
FIG. 11 is a cross-setional view illustrating another alternative support structure for attaching a bow-shaped member to the pool or hot tub of FIG. 1, wherein unused rail sections are stored below grade.

Another embodiment of the guide rails used in this invention is illustrated in FIG. 11. In this embodiment, rail sections 52 are mounted on a plate 230 attached to a portion of a trough 232 by a hinge 234. When the cover of this invention is partly or fully retracted, those rail sections 52 not in use may be pivoted on hinge 234 down into the trough and a lid 240, which may be also hinged as shown, is used to cover the trough containing the unused rail sections, thereby removing any above-ground obstruction or open-trough hazard to the users of the pool. This embodiment allows the operating cables 158 and 162 to be placed safely out of the way in the trough, where they remain fully functional. This embodiment also allows an electrical conduit 244 carrying power to the drive means 156, shown schematically in FIG. 1, to be placed in the trough and conveniently out of the way. Whereas this trough is open to rain and water that may be splashed from the pool, a bottom drain 242 is required to allow such waters to escape by gravity-driven flow therethrough.

While the individual parts of the invention have been described separately and in the manner in which they are assembled on a swimming pool or hot tub, it is understood that the individual parts can be sold as a kit that can be conveniently retrofitted on an existing pool, hot tub, or patio.

It is apparent that there has been provided in accordance with this invention a cover system for swimming pools, hot tubs, and patios, therefore, that satisfy the objects, means, and advantages set forth hereinbefore. According to the invention, the cover system can be easily, quickly, and relatively inexpensively retrofitted onto an existing pool, hot tub, or patio without any significant modifications to the unit.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A collapsible cover system for a recreation area, said cover system comprising:

a plurality of longitudinal rails fit together in end to end registering relationship to form two lenghts of said spaced guide tracks that extend along the sides of said recreation area;

a plurality of inverted bow-shaped members each having two free ends, each free end removably secured to said guide tracks; and plurality of carrier means for slidably connecting each free end of said bow-shape members to an associated guide track;

wherein each said rail section is associated by a hinge to a trough and wherein said rail section is selectably disposed in an operating position above grade and in a storage position below grade in said trough.

2. The collapsible cover system of claim 1 further including a flexible cover member supported by said bow-shaped members to enclose a portion of said recreation area when said bow-shaped members are in an expanded condition.

3. The collapsible cover system of claim 1 wherein said bow-shaped members are U-shaped in having a first generally horizontal portion adapted in use to extend transversely in spaced relation above said recreation area, said bow-shaped members having a pair of downwardly-extending vertical leg portions with free ends adapted in use to be secured to said guide tracks.

4. The collapsible cover system of claim 1 wherein each of said longitudinal rails has an interlock means at either end adapted in use to couple with said interlock means of an adjacent rail.

5. The collapsible cover system of claim 4 wherein said interlock means includes lock means at either end of said rails to secure adjacent coupled rails to each other.

6. The collapsible cover system of claim 4 wherein said interlock means comprises a "C"-shaped joining element that slidably engages adjacent rail sections.

7. The collapsible cover system of claim 1 wherein said trough has an associated cover.

\* \* \* \* \*